United States Patent [19]

Morris

[11] 3,997,073
[45] Dec. 14, 1976

[54] GREASE DISPOSAL APPARATUS

[76] Inventor: Carl E. Morris, 47 Dapplegray Lane, Rolling Hills Estates, Calif. 90247

[22] Filed: Sept. 2, 1975

[21] Appl. No.: 609,370

[52] U.S. Cl. .................................. 220/1 C; 206/72
[51] Int. Cl.² ..................... B65D 1/34; B65D 25/00
[58] Field of Search ...................... 220/1 C; 206/72; 229/2.5

[56] References Cited
UNITED STATES PATENTS

| | | | |
|---|---|---|---|
| 3,155,303 | 11/1964 | Fenkel | 229/2.5 |
| 3,567,067 | 3/1971 | Weiss | 206/72 X |

*Primary Examiner*—William Price
*Assistant Examiner*—Steven M. Pollard

[57] ABSTRACT

Grease disposal apparatus for use under an automotive vehicle, which includes a grease pan having a central portion adapted to rest upon the floor surface with the outer circumference of the pan being elevated so that grease collect thereon will run downward to the central portion, a quantity of grease-absorbent material placed upon the pan central portion but removable therefrom, and a removable cover over the grease-absorbent material.

A grease pan having a raised outer edge which is resiliently supported so that it will temporarily deflect towards the floor surface when a vehicle tire runs upon it, and being of such configuration that wind currents blowing across the grease pan will not exert a significant lifting force upon the pan either by blowing into a gap underneath the pan edge or by the airfoil of blowing across its upper surface.

3 Claims, 4 Drawing Figures

U.S. Patent  Dec. 14, 1976  3,997,073
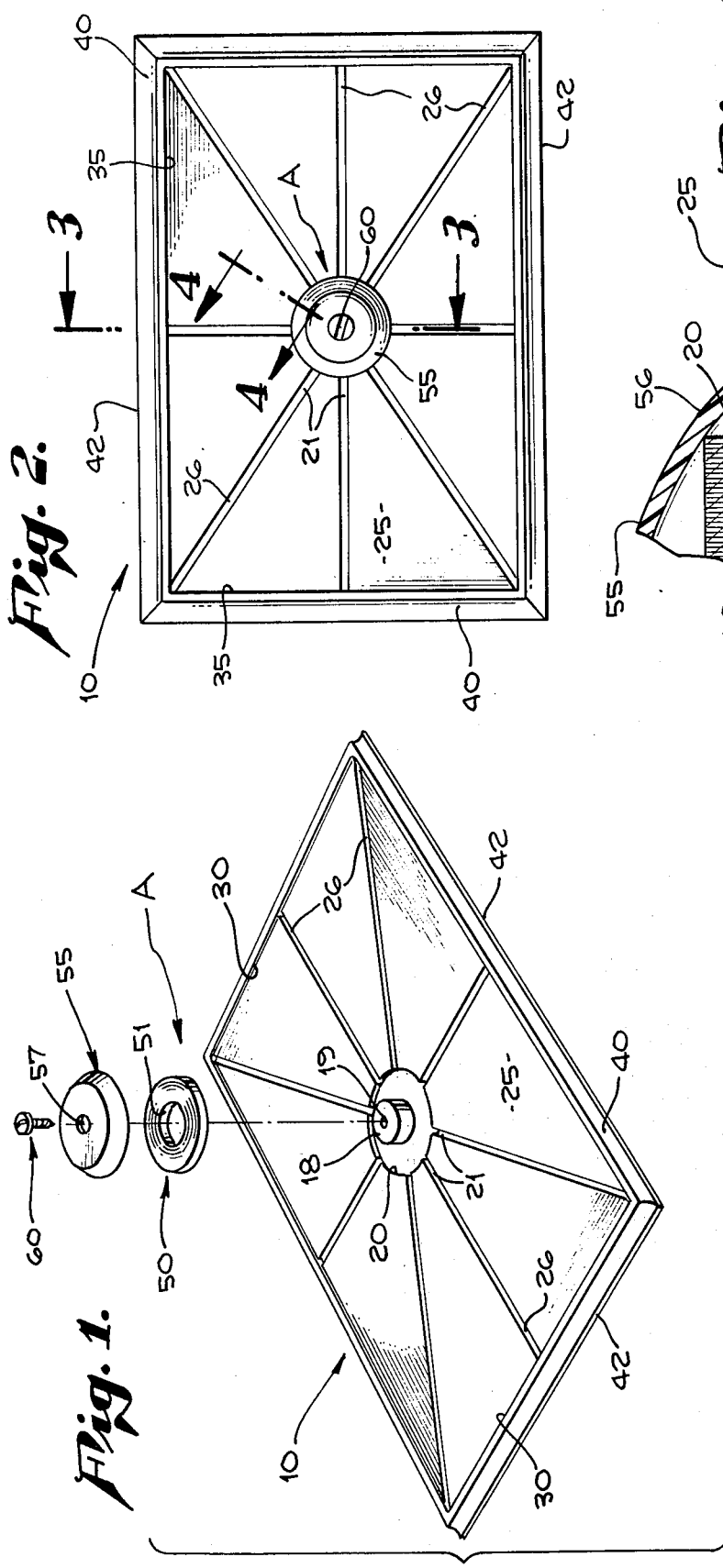
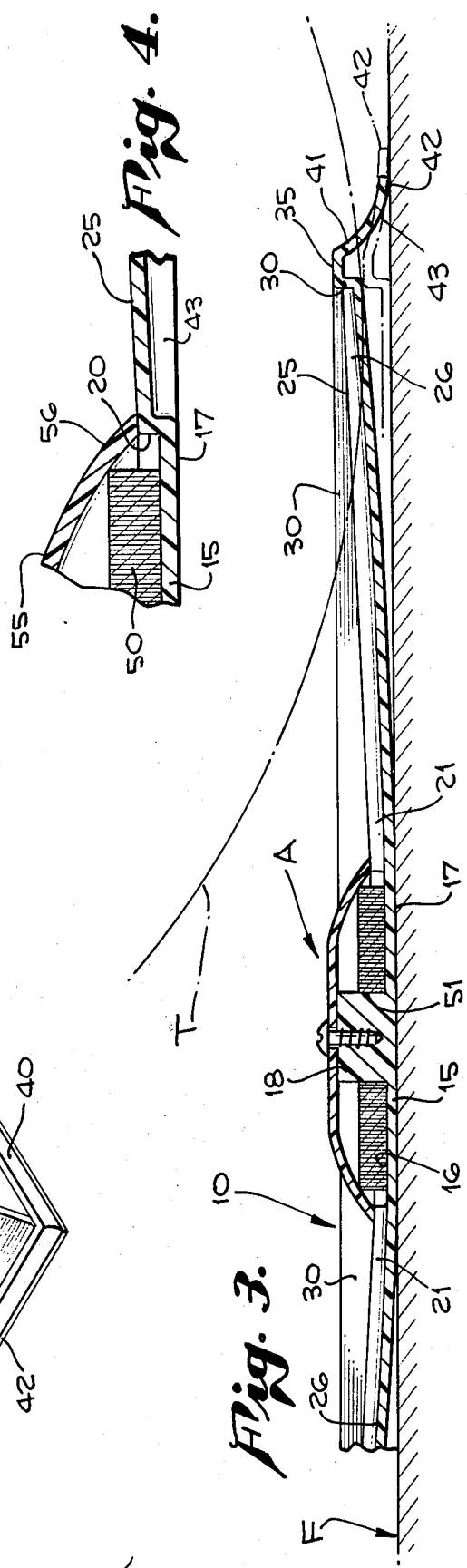

GREASE DISPOSAL APPARATUS

BACKGROUND OF THE INVENTION

Grease pans used under vehicle engines have had many disadvantages and limitations.

One disadvantage has been that removing accumulated grease from the grease pan has not been either easy or convenient.

Another disadvantage has been that grease accumulated in the grease pan has provided a trap for unwary pets or small children, who in turn have disseminated the grease in an undesirable manner.

Still another disadvantage has been that grease pans are often used in carports or other open locations, or in a garage where the door is open and wind forces have often dislodged or displaced the grease pan, sometimes spilling the accumulated grease.

One object of the invention is to provide a wind-proof grease pan.

Another object of the invention is to provide grease disposal apparatus which effectively prevents tampering or interference with accumulated grease.

Still another object of the invention is to provide grease disposal apparatus having a convenient means for disposal of accumulated grease.

SUMMARY OF THE INVENTION

According to one feature of the invention a grease pan is provided which is essentially wind-proof in that wind blowing parallel to a floor surface upon which the grease pan rests can neither enter underneath the edge of the grease pan nor exert an airfoil lifting effect when flowing above it.

According to a second feature of the invention a grease pan is provided with means for gathering, covering, and protecting the accumulated grease in a central location, so that it cannot be tampered or interfered with.

According to still another feature of the invention, grease disposal apparatus is provided with means for directing the flow of accumulated grease to a central location where an absorbent means is provided, and the absorbent means is so designed and arranged that it can be removed and thrown away when it becomes filled with grease, and a new absorbing means may then be substituted in its place.

DRAWING SUMMARY

FIG. 1 is an exploded perspective view of the presently preferred form of the invention;

FIG. 2 is a top plan view of the invention in its assembled form.

FIG. 3 is a cross-sectional elevational view of the apparatus taken on line 3—3 of FIG. 2; and FIG. 4 is a fragmentary cross-sectional view taken on line 4—4 of FIG. 2.

PREFERRED EMBODIMENT

Reference is now made to the drawing, FIGS. 1 through 4, inclusive, illustrating the presently preferred form of the invention.

Grease disposal apparatus A includes a grease pan 10, grease absorbent material 50, a removable cover 55, and fastening means 60. The function of grease pan 10 is to collect the grease and drain it, by force of gravity, to a central collection location. The function of absorbent material 50, positioned at the central location, is to absorb the grease that has been collected. The function of cover 55 is to prevent tampering or interference with absorbent material 50. Fastening means 60 provides removable attachment of cover 55 to the grease pan 10, and permits the cover 55 to be detached so that absorbent material which has become filled with grease may be thrown away and replaced with a new and grease-free absorbent.

Grease pan 10 is preferably integrally formed from a chemically inert type of material, or a type of material which is chemically inert insofar as oil and gas are concerned, and may for example be made of a plastic material such as polypropylene or high density polyethylene. The material from which the pan 10 is made should also have a rather high degree of resilience, as later described, and the polypropylene material has been found satisfactory for this purpose.

Grease pan 10 as presently illustrated is of rectangular configuration although it could also be either elliptical or circular, if that were desired. The pan 10 has a central part 15 which is the grease collection area or location, and the central part 15 has a generally circular flat upper surface 16 on which the collected grease is received and a flat bottom surface 17 which normally engages a floor F upon which the grease pan is resting. A pedestal 18 is located at the center of upper surface 16 and has a central hole 19 formed in the top thereof.

All the way around the central part 15 the material of pan 15 is raised in a step-wise fashion to provide a continuous peripheral wall 20. A plurality of grease entry ports 21 are positioned in circumferentially spaced locations around the peripheral wall 20. The entry ports 21 are the lower or discharge ends of respective grooves 26, as will be later described.

The absorbent material 50 is preferably an elongated strip of paper or cloth which has been formed into a roll whose axial length is rather small compared to its diameter. The roll has a central opening 51. In the assembled form of apparatus A, as shown in FIGS. 2 through 4, the roll 15 is placed with one end face thereof engaging the circular flat surface 16 of the central part 15 of the grease pan 10, and with the central opening 51 of the roll being disposed about the pedestal 18. The pedestal 18, therefore, serves to establish the position of the absorbent roll 50.

The cover 55 is essentially a flat circular plate which is preferably made from the same plastic material as the grease pan 10, however, its entire outer edge portion 56 is curved downwardly so as to provide an essentially dish-shaped configuration. In the assembled apparatus this dish is turned upside down and covers the roll 50 and pedestal 18. Cover 55 has a small central hole 57 formed therein, and the self-tapping bolt 60 is inserted through the hole 57 and into the hole 19 of the pedestal and is then tightened for securing the cover 55 in place.

It will be noted in the particular illustration that the axial length of roll 50 is about three times the height of peripheral wall 20, but only about half the height of pedestal 18. In the assembled form of the apparatus when cover 55 is in place it engages the upper circumferential edge of roll 50 and also extends closely adjacent to the upper surface of peripheral wall 20. However, the multiple grease entry ports 21 permit accumulated grease to flow into the grease collecting location, underneath the peripheral edge of cover 55.

The main part or main portion 25 of grease pan 10 extends radially outwardly from the central portion 15, and at the same time it extends upwardly to an elevated position above the floor surface F. The slanting main portion 25 of the pan is therefore effective to collect grease and cause same to flow by force of gravity into and upon the central pan portion 15. A number of grooves 26 are formed in the upper surface of the main pan portion 25, and these grooves extend radially outwardly from the pan central portion 15. The inner end of each groove, as previously mentioned, forms a corresponding one of the grease entry ports 21 associated with the central collection location.

As best seen in FIG. 3, the depth of each groove 26 is about the same as the height of the peripheral wall 20. Therefore, each groove 26 with its associated grease port 21 discharges accumulated grease into the central collection area and immediately upon and at the elevation of the upper surface 16 of central pan portion 15.

Near the outer periphery of grease pan 10 there is a circumferential wall 30 which rises vertically upward and has a vertical height of about one-half inch. From the upper edge of wall 30 a horizontal flange 35 projects horizontally outwardly about one-half inch. Then there is an apron 40 formed at the outer edge of flange 35. The inner portion 41 of apron 40 is angled downwardly from the flange 35 at an angle of approximately 45 degrees. But as the apron extends further away from flange 35 it curves in a relatively upward direction until its outer end portion 42 is substantially horizontal and substantially parallel to floor surface F.

Thus as best seen in FIG. 3 the apron 40 normally has its outer edge portion 42 in supporting engagement upon the floor F and thereby holds the flange 35 in an elevated position, about one inch above the floor. At the same time the outer extremity of the pan main portion 25, which connects with the lower edge of the circumferential wall 30, is an elevation of about one-half inch above the floor. Each groove 26 therefore provides a drop of nearly one-half inch for purpose of conveying grease to the collection location.

FIG. 3 illustrates in dotted lines the condition that occurs when a vehicle tire T runs over or upon the grease pan 10. The apron 40 bends resiliently, its outer edge portion 42 expanding radially outwardly from the pan central portion 15, and at the same time the elevation of both the circumferential wall 30 and the horizontal flange 35 drop by about half an inch, until the main portion 25 of the pan that was formerly elevated above the floor now engages and rests upon the floor surface. When vehicle tire T passes, however, the pan will again raise to its former position. It is important to note the function of wall 30 when the tire T runs over the pan. Wall 30 then serves to confine all of the collected grease within the pan, which might otherwise not be the case. Horizontal flange 35 has two important functions. One is to distribute the load when a vehicle tire runs over an edge portion of the pan. That is, the load received from the vehicle tire is not concentrated entirely on one portion of the pan edge but by virtue of the flange 35 is spread in both directions so that it is absorbed by a significant length of the circumferential edge portion of the pan. Wall 30 assists in this function.

The second important function of horizontal flange 35 is in regard to wind resistance. A wind stream blowing horizontally and hence parallel to floor F is deflected upwardly by apron 30, but yet the flange 35 prevents the deflected air stream from having a lifting effect upon the pan.

It will also be noted that the configuration of apron 40 and particularly its outer edge portion 42, prevents a wind stream from entering underneath the pan 10. Therefore, despite the rather lightweight of the pan 10 resulting from the plastic material from which it is made, it is entirely wind proof, and cannot be displaced either by a wind stream getting underneath the pan or by a wind stream blowing above the pan edge and exerting a lifting force thereon.

While a particular form of absorbent material 50 has been described it is evident that in place of an elongated strip of material that is formed into a roll it may instead be preferred to use a single flat pad of fiber or other absorbent material.

The pedestal 18 is not indespensible, and it is not absolutely essential that cover 55 have its circular dish-shaped configuration as shown. However, the illustrated configuration of pedestal and cover does have the advantage of resisting damage by a vehicle tire in event that a vehicle tire should run over the center portion of the grease pan.

Although the grooves 26 are shown as terminating at the circumferential boundary of the pan central part 15, it will nevertheless be understood that these grooves or a miniature version thereof may if desired be extended some distance into the central part 15 and, for that matter, may extend all the way to the pedestal 18. Such extension of the grooves 26 would accelerate the rate at which grease is absorbed by the absorbent material 50.

It will be noted that grease pan 10 has a substantially uniform wall thickness throughout, which is advantageous for manufacturing purposes.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. Grease disposal apparatus comprising, in combination:
    an integrally formed base member made of a plastic material, having a base portion with a flat generally circular upper surface thereon, a peripheral wall surrounding said flat surface and having a number of grease entry ports formed therein, and a generally cylinder pedestal rising up from the center of said flat circular surface and substantially concentric therewith;
    an elongated flat strip of grease absorbent material formed into a roll with a central opening therein, said roll having one end face thereof disposed upon said flat circular surface of said base member and said central opening thereof receiving said pedestal;
    a generally circular cover member disposed above and covering said roll, the peripheral edge of said cover member being disposed in close proximity to the upper surface of said peripheral wall of said base member; and
    means detachably securing the center of said cover member to said pedestal of said base member.

2. Apparatus as in claim 1 wherein the thickness of the roll is greater than the height of said grease entry ports, and the cover member is downwardly curved on its peripheral edge to a cup-shaped configuration.

3. Grease disposal apparatus comprising, in combination:
an integrally formed grease pan having a central portion adapted to rest upon the floor surface, a main portion extending radially outwardly from said central portion and at the same time upwardly to an elevated position above the floor surface so as to collect grease and cause same to flow down into and upon said central portion, and a circumferentially extending peripheral apron portion which extends outwardly from said main portion and then downwardly to supportingly engage the floor surface, said apron being resilient whereby the elevated portion of said pan may be temporarily deflected downward to the floor surface whenever a vehicle tire runs thereupon;
a quantity of grease-absorbent material removably disposed upon said pan central portion; and
a cover removably disposed above said grease-absorbent material and cooperating with said pan to provide multiple paths through which grease may flow into said pan central portion.

\* \* \* \* \*